Nov. 6, 1962    J. R. JARABAK    3,061,929
DIFFERENTIAL FORCES EDGEWISE BRACKET
Filed Sept. 9, 1960

INVENTOR.
JOSEPH R. JARABAK
BY
Philip H. Sheridan
ATTORNEY

United States Patent Office 3,061,929
Patented Nov. 6, 1962

3,061,929
DIFFERENTIAL FORCES EDGEWISE BRACKET
Joseph R. Jarabak, 230 165th St., Hammond, Ind.
Filed Sept. 9, 1960, Ser. No. 55,065
5 Claims. (Cl. 32—14)

This invention relates to a novel and useful article of manufacture adaptable for correcting irregularities in teeth, and more particularly relates to a bracket designed for connection to a tooth to accommodate a wire element in a unique manner for the application of differential forces to the tooth.

Various types of orthodontic appliances have been devised which in combination with some suitable type or form of ribbon or rectangular wire are effective to correct tooth irregularities, such as rotations, tipping, depressions or elongations. Generally, however, the torque-applying wire elements are of necessity specially formed and require in addition some special tying or securing element to hold the elements in place.

The present invention is directed to a novel bracket construction which makes it possible to apply a predetermined amount of torque and in a predetermined direction against the tooth through the use of a torque-applying element such as a single strand of round wire, and accomplishes this in such a way that it is not necessary to provide some special securing means to hold it in place. More specifically, the bracket of the present invention enables insertable disposition of the torque applying element in self-locking relation in place in the bracket for extension from the bracket into engagement with the tooth to apply the desired amount and direction of torque, and the securing of the torque applying element in place may be carried out in a single operation whether the desired correction be related to rotations, tipping, depressions or elongation of the teeth. In addition, through the use of highly resilient wires in conjunction with the bracket of the present invention, tooth regulating may be performed in a much shorter period of time than heretofore possible.

Accordingly, it is a principal object of the present invention to provide for a way of correcting irregularities in teeth, such as rotations, tipping, depression or elongation in a quick and efficient manner and through only a single operation.

It is another object of the present invention to provide for a bracket, commonly referred to as an edgewise bracket, which is so constructed and arranged as to enable insertable disposition of a torque applying member in place for extension of the member from the bracket into engagement with a tooth for the application of torque in a selected direction depending upon the type and extent of irregularity of the tooth.

It is a further object of the present invention to provide for a bracket, or series of brackets, so designed as to provide for insertion in self-locking relation of a wire element in a single operation and wherein the wire element is firmly supported by the bracket for extension in the desired direction to apply a controlled amount of torque to the tooth.

It is a still further object to provide for an edgewise bracket which can be easily and economically manufactured, is compact and easily applied to a tooth, the bracket being so constructed and arranged as to provide for self locking insertion of a rounded wire element in specially designed slotted portions formed in the bracket for extension in a predetermined direction to apply a controlled amount of torque to the tooth and wherein the wire element is held in self locking relation without the use of special tying or locking elements.

It is an additional object of the present invention to provide for a series of brackets adaptable for connection along a row of teeth and wherein the bracket members are cooperative with one another to provide for insertible disposition in self locking relation with each of the brackets of a common wire element extending therebetween and wherein the wire element is connectible to the brackets for the application of a predetermined amount of torque or force against the respective teeth for the purpose of correcting various irregularities of the teeth. Other objects and advantages of the present invention will become more apparent from the following detailed description taken together with the accompanying drawings, in which:

Figure 1:
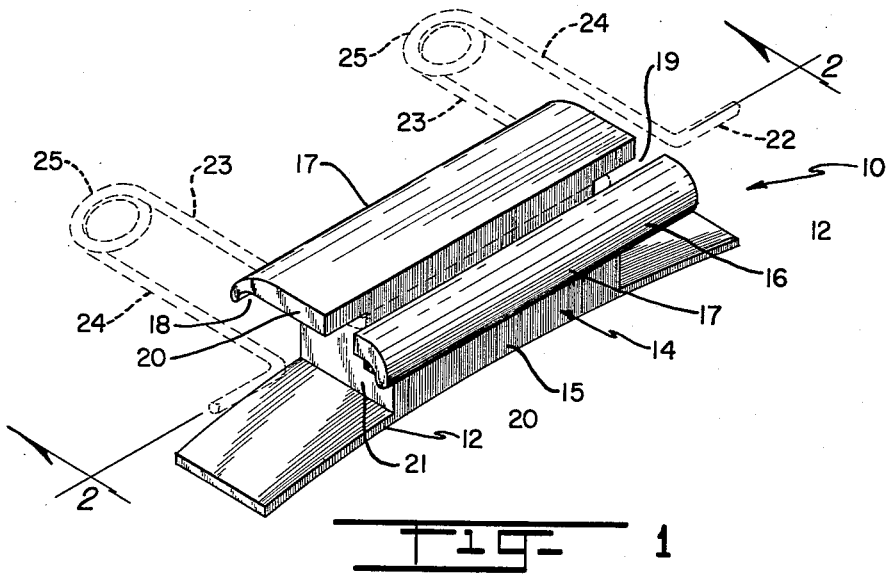
FIGURE 1 is a perspective view on an enlarged scale of a preferred form of bracket together with a wire element positioned in place in the bracket in such a way as to apply a predetermined amount of torque to a tooth, in accordance with the present invention.

Referring more particularly to the drawings, there is shown by way of illustrative example a bracket member 10 which is broadly made up of a base flange portion 12 with a body portion 14 mounted on the flange, the body portion having a solid base 15 which is generally rectangular in cross section together with an outer arch wire receiving portion 16. In accordance with well known practice, the labial or outer arch wire receiving portion 16 may include a pair of projections or wings 17 which extend laterally beyond the sides of the base 15 of the body portion and are curved downwardly so as to effectively form recesses 18 for disposition of a suitable tie wire, not shown, which is normally employed to secure an arch wire in place within the slot 19 formed in the arch wire receiving portion.

The bracket as above described in general terms is commonly employed in orthodontics for the correction of irregularities in teeth and a more specific disclosure of the manner of construction and arrangement of such a bracket is set forth in Patent No. 2,527,526. Also, as specifically shown and disclosed in that patent, a series of brackets may be manufactured in strip form or generally in connected relation wherein the flanges are welded in place to a common tooth band on the tooth or if desired, a number of brackets may be left in connected relation for connection to a tooth band over a row of teeth.

A primary feature of the present invention resides in the manner of disposition of the slot 19 which is disposed to extend longitudinally of the body portion or more specifically would extend horizontally when the bracket is connected to the tooth and instead of centrally positioning the slot intermediately between the projecting wings 17 the slot is offset toward one side of the bracket. In addition, either or both ends 20 of the bracket are designed such that the outer arch wire receiving portion 16 overhangs the ends of the body as at 20 to form vertical set-ins or slots 21 beneath the overhanging portion 20 with the vertical set-ins 21 communicating with the horizontal slot 19, as shown. Of course, the horizontal slot 19 may be formed by coring the slot out of the outer or labial surface while the vertical set-ins 21 may be formed by machining out the body portion beneath the respecive ends of the outer arch wire receiving portion. Through this unique construction and arrangement of the horizontal slot 19 and vertical set-in or set-ins 21, a torque-applying element, preferably in the form of a rounded wire element 22 may then be inserted in the horizontal slot 19 then extended upwardly as at 23 along the end surface of the body portion 14 whereupon the overhanging portion 20 is operative to hold the turned portion 23 of the wire element in place. Upon doubling the wire element back as at 24 so as to make the turned portion of the wire element generally U-shaped, the resiliency of the wire will cause the wire portion 23 to be urged tightly against the end of the body and at the same time be restrained from upward or outward movement. Moreover, the wire element may be looped as at 25 for a purpose to be described and this will also serve to urge the bent portion 23 firmly against the end portion of the body so as to prevent accidental release of the wire element.

In mounting the bracket and wire assembly, when the bracket is applied to the tooth band, the slot is most desirably offset incisally or toward the cutting edge of the tooth with the wire element 22 extending upwardly along the vertical set-in portion and thus along the greater distance at the end of the slot so that the wire surface to bracket surface area is materially increased to thereby provide a firm support for the wire which is very desirable in controlling defects in teeth such as labial, lingual or crown torque.

It is of course customary to employ a number of brackets at spaced intervals over a row of teeth. For example, a bracket may be employed at each distal end of a row of teeth, together with another bracket positioned or stationed at the mesial area of the teeth and wherein a common wire element such as the wire 22 is employed to extend between the mracket elements. Accordingly, when the wire element is looped to extend from the bracket along the vertical set-in portions, the returning length 24 of the loop will then be continued horizontally to the next bracket at which point an additional loop may be formed in the wire element to apply the desired amount of torque to the tooth. Through this arrangement therefore the spring-like wire elements when formed into the U-shaped portions incorporating the loops 25 are cooperative to urge the respective U-shaped portions formed in the other brackets into firm engagement with the bracket to prevent accidental release and eliminate the necessity for special tying or ligature wires. The loops 25 are essentially in the form of helical torsion or expansion loops which as mentioned aid in maintaining the wire elements in self-locking relation, and primarily operate to exert the desired amount of torque in the desired direction to the tooth.

As mentioned, either one or a pair of vertical set-ins may be utilized at one or both ends of a bracket respectively and selection of either type of bracket will of course depend upon the manner in which the torque must be applied to the tooth in order to correct the deficiency. Usually, the loop portion formed by the lengths 23, 24 and loop end 25 of the wire element is extended upwardly toward the gum area of the tooth and with the loop end 25 engaging the tooth to apply pressure thereto. Thus, if desirable to apply pressure to both sides of the tooth, a bracket incorporating a pair of vertical set-ins 21 at either end would be employed to accommodate a pair of loop portions. Actually, with the wire element 22 secured along a row of teeth and positioned in self-locking relation in a number of brackets, urging of the loop portions of the wire element in the vertical set-in portion would be effective to offer maximum control over labial or lingual tipping of the roots of the anterior teeth while at the same time urging of the wire element within the horizontal slot would offer maximum control over mesial and distal axial movements of the teeth. In this connection, it is to be understood that the bracket of the present invention may be employed to accommodate various types of torque applying members such as a ribbon type arch wire or rectangular wire in addition to the round wire element 22 which is most preferably employed.

Figure 2:
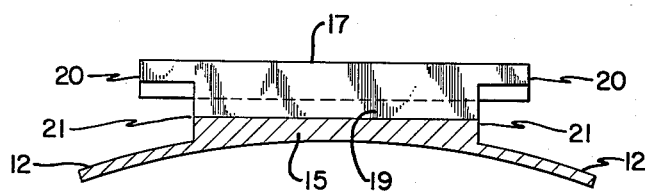
FIGURE 2 is a cross sectional view taken on line 2—2 of FIGURE 1.
Figure 3:
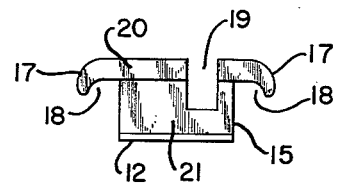
FIGURE 3 is an end view of the preferred form of bracket shown in FIGURES 1 and 2.

The following relative proportions and dimensions are given for the purposes of illustration only and not for limitation, to provide a more exact and detailed understanding of the features of the present invention: For a bracket having a length ranging from .075 inch for a small bracket to .190 inch for a larger type, the width thereof may be on the order of .120 inch, and the horizontal slot 19 may be machined out of the outer surface of the bracket in the lower one-third portion thereof with dimensions on the order of .016 inch wide by .030 inch deep to accommodate a correspondingly sized arch wire. At the same time, the vertical set-in portions may be recessed to be .016 inch deep by .0045 inch wide so as to easily accommodate the looped ends of the arch wire. Most preferably, the flange 12 is also bent or made arcuate to conform to the surface of the tooth and the tooth band to which it is to be secured as shown in FIGURE 2.

In positioning the arch wire elements in place, of course the extent of differential forces or torque applied by the tortion loop portions of the wire element 22 may be controlled upon insertion but in any event it is to be noted that the wire element is easily inserted in place in a single operation simply by laying the wire element first in the horizontal slot and then bending it upwardly and doubling it over to form the looped ends. At this point, the wire element will then be positioned in self-locking relation in the bracket and with the loop portion engaging the tooth to exert the desired pressure. In the event that it is not desired to form the loop portions at the ends of the bracket, then it will be evident that the lateral wings 17 may be employed for a ligature or tie wire which may be looped underneath the wings 17 and over the arch wire to hold it securely in place in the bracket.

It will thus be evident that the bracket of the present invention provides a unique way of enabling the self-locking disposition of an arch wire in place for applying the desired amount of torque to a tooth member and which in combination provides a quick and efficient way of securing a tooth correcting appliance in place while eliminating the necessity for any special locking or tying elements. In addition, the bracket is conformable for use with various types of arch wires depending upon the application and may be formed in various sizes and of various materials to accomplish the objects of the present invention. Of course various other modifications and changes may be made in the construction and arrangement of the bracket together with the type of arch wire employed without departing from the scope of the invention as defined by the appended claims throughout, reference to vertical and horizontal slots is made assuming the bracket is located on a tooth band in the customary manner.

What is claimed is:

1. An edgewise bracket comprising a portion adapted for attachment to a tooth band, a body including an outer arch wire receiving portion provided with a horizontal slot in the outer surface thereof, the slot being offset relative to the longitudinal axis of said body, lateral projections on opposed sides of said body extending parallel to the horizontal slot for accommodating a ligature wire and the like therein, said body being provided with a vertical recess at least at one end thereof communicating with the horizontal slot to provide for extension of an arch wire disposed in the horizontal slot.

2. An orthodontic device comprising: an edgewise bracket having a body provided with a horizontal slot adapted to receive an arch wire and a vertical slot in said body communicating with the horizontal slot; and an arch wire disposed in the horizontal slot including a generally U-shaped vertical extension disposed in the vertical slot for projection beyond the bracket into engagement with a tooth.

3. An orthodontic device comprising: an edgewise bracket having a body including a horizontal slot adapted to receive an arch wire and a vertical slot at least at one end of said body communicating with the horizontal slot; and an arch wire disposed in the horizontal slot including a generally U-shaped vertical extension disposed in the vertical slot in self-locking relation for projection beyond the bracket into engagement with a tooth.

4. An orthodontic device comprising: an edgewise bracket having a body provided with a horizontal slot adapted to receive an arch wire, and an overhanging portion forming a vertical slot at one end of said body communicating with the horizontal slot; and an arch wire disposed in the horizontal slot including a generally U-shaped vertical extension disposed in self-locking relation in the vertical slot for projection beyond the bracket into engagement with a tooth, the vertical extension of said arch wire being provided with a loop at the tooth engaging portion thereof to apply a predetermined differential force to the tooth.

5. An edgewise bracket comprising a portion adapted for attachment to a tooth band, a body including an outer arch wire receiving portion provided with a horizontal slot in the outer surface thereof, lateral projections on opposed sides of said body extending parallel to the horizontal slot for accommodating a ligature wire and the like therein, said body being provided with a vertical recess at least at one end thereof communicating with the horizontal slot to provide for extension of an arch wire disposed in the horizontal slot.

References Cited in the file of this patent
UNITED STATES PATENTS

| | | |
|---|---|---|
| 1,481,861 | Eaton | Jan. 29, 1924 |
| 1,821,171 | Atkinson | Sept. 1, 1931 |
| 2,908,974 | Stifter | Oct. 20, 1959 |
| 2,926,422 | Wallshein | Mar. 1, 1960 |